(12) United States Patent
Dengler et al.

(10) Patent No.: US 7,868,914 B2
(45) Date of Patent: Jan. 11, 2011

(54) VIDEO EVENT STATISTIC TRACKING SYSTEM

(75) Inventors: John D. Dengler, Durham, NC (US); Erik J. Garci, Durham, NC (US); Brian C. Cox, Durham, NC (US); Kenneth T. Tolman, Durham, NC (US); Hans Weber, Chapel Hill, NC (US); Gerard J. Hall, Durham, NC (US); Matthew Lane Rosen, Durham, NC (US)

(73) Assignee: SportsMEDIA Technology Corporation, Durham, NC (US)

( * ) Notice: Subject to any disclaimer, the term of this patent is extended or adjusted under 35 U.S.C. 154(b) by 1604 days.

(21) Appl. No.: 11/146,956

(22) Filed: Jun. 7, 2005

(65) Prior Publication Data

US 2005/0285877 A1 Dec. 29, 2005

Related U.S. Application Data

(60) Provisional application No. 60/577,669, filed on Jun. 7, 2004.

(51) Int. Cl.
*H04N 15/00* (2006.01)
*H04N 7/12* (2006.01)

(52) U.S. Cl. .................................. 348/157; 348/402.1

(58) Field of Classification Search ................. 348/157, 348/402.1, 401.1, 407.1, 169, 589, 159, 153, 348/161, 700, 699, 907, 150, 154, 155, 135, 348/137, 170; 382/128, 154, 103, 260, 255, 382/265, 238, 236, 165, 275, 268, 261; 375/240.25, 375/240.15; 345/632, 634, 647, 619
See application file for complete search history.

(56) References Cited

U.S. PATENT DOCUMENTS

| | | | |
|---|---|---|---|
| 5,923,365 A | 7/1999 | Tamir et al. | |
| 5,926,780 A | 7/1999 | Fox et al. | |
| 5,969,755 A | 10/1999 | Courtney | |
| 6,133,946 A | 10/2000 | Cavallaro et al. | |
| 6,141,041 A | 10/2000 | Carlbom et al. | |
| 6,167,356 A | 12/2000 | Squadron et al. | |
| 6,233,007 B1 | 5/2001 | Carlbom et al. | |
| 6,292,130 B1 | 9/2001 | Cavallaro et al. | |
| 6,304,665 B1 | 10/2001 | Cavallaro et al. | |
| 6,441,846 B1 | 8/2002 | Carlbom et al. | |
| 6,456,232 B1 | 9/2002 | Milnes et al. | |
| 6,539,336 B1 | 3/2003 | Vock et al. | |
| 6,593,852 B2 | 7/2003 | Gutta et al. | |
| 6,710,713 B1 | 3/2004 | Russo | |
| 6,765,565 B2 | 7/2004 | Sayers et al. | |
| 6,810,397 B1 | 10/2004 | Qian et al. | |
| 6,850,250 B2 | 2/2005 | Hoch | |
| 6,891,570 B2 | 5/2005 | Tantalo et al. | |
| 2002/0044683 A1* | 4/2002 | Deshpande et al. | ......... 382/165 |
| 2002/0071594 A1* | 6/2002 | Kool et al. | .................. 382/103 |

(Continued)

*Primary Examiner*—Behrooz Senfi
(74) *Attorney, Agent, or Firm*—Pepper Hamilton LLP

(57) ABSTRACT

A method for calculating a parameter from an image sequence includes selecting a first frame and a second frame in an image sequence. The image sequence has a frame speed. The image sequence or another image sequence is enhanced using a calculation that considers the frame speed and selected frames. The enhancement may be with text, graphics or both such as those that may present statistics corresponding to an event in the image sequence.

12 Claims, 3 Drawing Sheets

U.S. PATENT DOCUMENTS

| | | | |
|---|---|---|---|
| 2003/0012409 A1* | 1/2003 | Overton et al. | 382/103 |
| 2003/0223499 A1* | 12/2003 | Routhier et al. | 375/240.25 |
| 2004/0015597 A1* | 1/2004 | Thornton | 709/231 |
| 2004/0252230 A1* | 12/2004 | Winder | 348/402.1 |
| 2005/0041842 A1* | 2/2005 | Frakes et al. | 382/128 |
| 2006/0164439 A1* | 7/2006 | Dengler et al. | 345/634 |
| 2007/0201694 A1* | 8/2007 | Bolle et al. | 380/205 |

* cited by examiner

VIDEO EVENT STATISTIC TRACKING SYSTEM

RELATED APPLICATIONS AND CLAIM OF PRIORITY

This application claims priority to U.S. Provisional Patent Application No. 60/577,669, filed Jun. 7, 2004, which is incorporated herein by reference in its entirety.

TECHNICAL FIELD

The embodiments described below relate to video image processing. More particularly, the embodiments relate to a method and system for measuring a parameter associated with an event, based on at least a progression of an image stream that captures the event.

BACKGROUND

The television industry is continuously seeking technology improvements that will enhance the presentation of an event. In particular, producers of television sporting events seek to obtain viewers by using new video enhancement technologies. Virtual lines, a coach's chalkboard-like overlay and statistic presentation headers and footers are examples of recent technologies that are in great demand by increasingly fickle viewing audiences. Indeed, video enhancement technologies such as these are used not only in sporting events but also in news broadcasts, award ceremonies, concerts and other presentations of live events.

Sporting events have also pushed the television industry to find new ways of presenting detailed statistics about various aspects of an event. For example, the speed of a baseball pitch or the hang time of a football kick are often measured by an individual using a radar gun or a stop watch. Unfortunately, current statistic measurement systems rely on human measurement, which may be prone to error or inaccuracy. For example, because of human reaction time, a person using a stop watch to measure the hang time of a football may not start or stop the watch precisely when the ball hits the kicker's foot or the receiver's hands. In addition, current measurement methods are limited in that they only calculate one parameter, and they do not allow calculation of multiple statistics, or the relation of video enhancement to the statistics, because they rely on human judgment.

For example, U.S. Pat. No. 6,133,946 to Cavallaro et al., the disclosure of which is incorporated herein by reference in its entirety, discloses a system that may measure events within a video image, such as a hang time for a jump. However, such methods have limited applicability, as they do not provide for complex calculations such as speed, as they provide no mechanism to consider relative positions within a frame sequence. Further, they do not provide for the graphical representation of the parameters in the image sequence or in alternate image sequences, nor do they allow for presentation of the parameter in real time, as the event occurs.

As another example, U.S. Pat. No. 6,441,846 to Carlbom et al., the disclosure of which is incorporated herein by reference in its entirety, discloses a method of deriving performance statistics real time tracking of a sporting event. However, such methods are limited to the prediction of trajectories based on extrapolation, and they require real time tracking of the event.

Accordingly, we have determined that it is desirable to provide an improved measurement of determining and presenting statistics for an event in an image stream that captures the event.

SUMMARY

Figure 1:
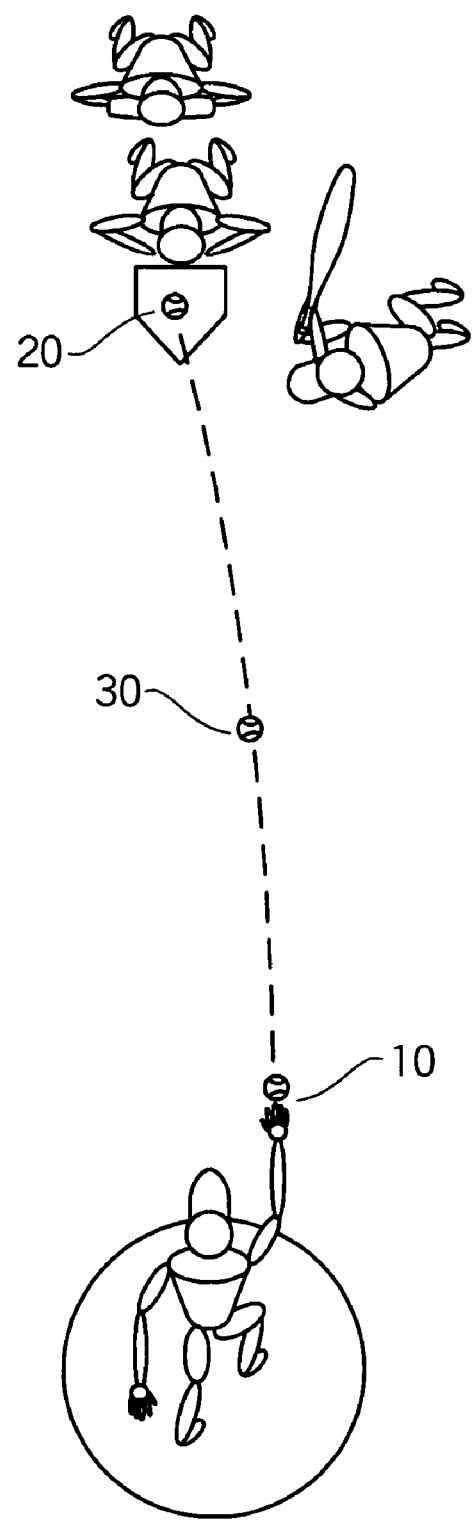
FIG. 1 illustrates an exemplary image sequence for an event, with exemplary reference points within the image sequence.

In one embodiment, a method for calculating a parameter from an video image frame sequence includes selecting a first frame and a second frame in a frame sequence. The frame sequence has a frame rate. The method also includes calculating a first parameter using the frame rate, and optionally a factor such as a number of elapsed frames between the second frame and the first frame. The first parameter may correspond to at least one real world event in the first frame and a related real world event in the second frame, such as an elapsed time, distance and/or speed associated with the starting point and ending point of an action sequence. Optionally, the selecting of the first frame and the selecting of the second frame may be performed while the frame sequence is occurring in real time. Alternatively, the selecting of the first frame and/or the selecting of the second frame may be performed during a playback mode after the sequence has been recorded. Also optionally, the selecting of the first frame may include selecting a first location of a real world event in the first frame, the selecting of the second frame may include selecting a second location of a related real world event in the second frame, and the calculating step may also use the first and second locations. The calculation may consider a predetermined factor corresponding to the real world event, such as distance, length, space, height, altitude, elevation, speed, and/or elapsed time.

Optionally, the method may also include selecting an intermediate frame in the frame sequence, and calculating a second parameter using the frame speed and a number of elapsed frames between the intermediate frame and the first frame. The first or second parameter may relate to a location in a frame that is between the intermediate frame and either the first frame or the second frame in the sequence.

The method may also include enhancing a second frame sequence using the first parameter through an item such as insertion of a graphical enhancement, such as a text box corresponding to the first or second parameter, graphic or other enhancement. In some embodiments, the inserting may be performed based on knowledge of a characteristic of the camera and without reference to any content of the second frame sequence Also optionally, if the frame sequence had been captured from a first camera at a first camera location at stadium, track, arena or other venue, and the second image sequence was captured from a second camera at a second camera location, the method may also include inserting, into the second image sequence, an image corresponding to one or more real world events at a location derived using the first or second parameter.

The method may also include comprising enhancing a selected frame sequence using the first parameter by inserting an image that is representative of the parameter into the selected frame sequence. Optionally, the enhancing is performed in real time as the real world events occur, an the selected sequence may be displayed to a viewed so that the viewer can see the parameter as it changes and as the real world events occur.

In an alternate embodiment, a system for calculating a parameter from video image frame sequence includes an image viewing device that enables an operator to select a first frame and a second frame in a frame sequence with a frame rate, a parameter calculation device that calculates a parameter using the frame rate, and an image displaying device which displays the information from the parameter in the form of a graphic that is inserted into an image sequence. Optionally, the image viewing device and the image displaying device may be the same device. Further, in some embodiments the image viewing device may also enable an operator to select an intermediate frame in the frame sequence, and the parameter calculation device may calculate another parameter using the frame rate. The displaying device may insert the information into a frame sequence in correspondence to a time of occurrence of one or more real world events.

DETAILED DESCRIPTION

In the following description, numerous details are set forth in order to provide a thorough understanding of the invention. It will be apparent, however, to one of ordinary skill in the art, that the invention may be practiced in various ways without limitation.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications and statistical data mentioned herein are incorporated by reference. Nothing herein is to be construed as an admission that the invention is not entitled to antedate such documents or data.

In various embodiments, a method and/or system measures one or more parameters in an video image frame sequence and enhances a video image or sequence based on the parameter. For example, referring to FIG. 1, an image sequence of a baseball game may include a series of video frames depicting the action from a point when the pitcher throws a pitch to the point when the pitch reaches the plate or the batter. Referring to FIG. 1, the pitcher releases the ball at a release point 10, and the ball crosses the plate at an end point 20 near the batter. The release of the ball is a first real world event and the ball crossing the plate is a second real world event which is related to the first real world event. One or more intermediate points 30 may exist along the path of the ball from the release point 10 to the end point 20. The image sequence may be captured by one or more video cameras located in and/or near the stadium or other venue. For example, one or more cameras may be placed along the baselines, behind the batter, in the upper deck of the stadium, overhead, in a blimp, or at one or more other vantage points.

The event may be captured in a series of video frames that may be stored on tape and/or in a computer-readable memory. That series of video frames make up at least a portion of an image sequence. The speed of the capture of the image sequence may be referred to as the frame speed. The frame speed may be used to determine one or more parameters associated with the event. In typical American television event recordings, the speed by which the image sequence is captured and played back is approximately thirty frames per second. However, any speed of an image sequence can be used, such as twenty-four frames per second (common in film work) or twenty-five frames per second (common in Europe).

Figure 2:
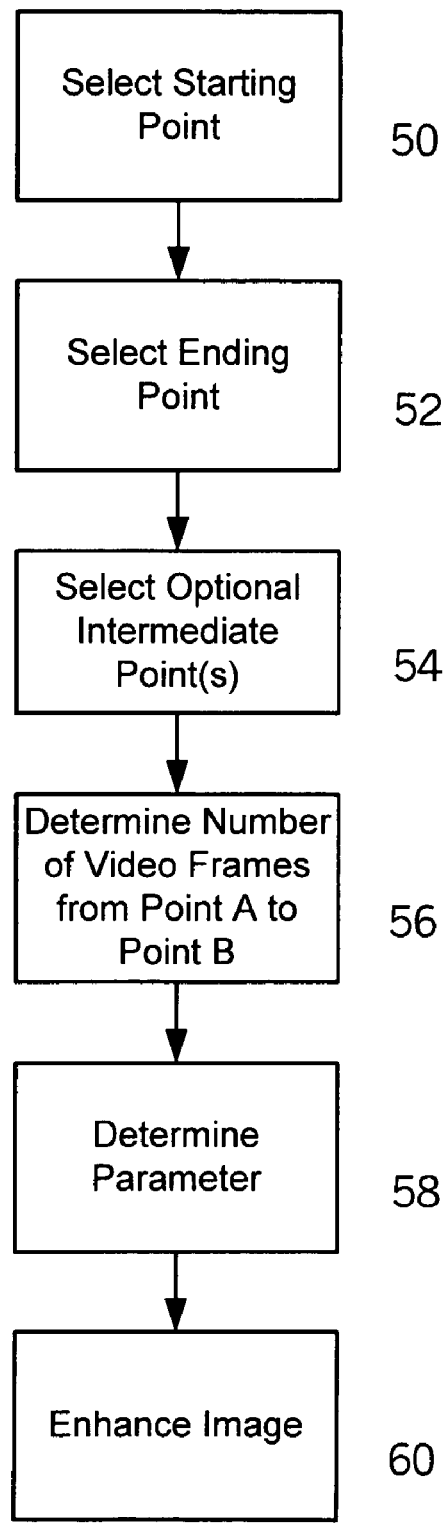
FIG. 2 is a process flow diagram of elements in an exemplary embodiment of a video statistic tracking method.

Referring to FIG. 2, an embodiment of the invention may include selecting a starting point in the image sequence (step 50) and selecting an ending point in the image sequence (step 52). The starting point may be the first frame or another frame in the image sequence, and the ending point may be a second frame occurring later in the image sequence. Optionally, one or more intermediate points may also be selected in the image sequence (step 54). Optionally, the selection of each point may be done in real time (i.e., while an operator is watching the image sequence). When the selection is done in real time, the image sequence may be captured as it is occurring. Alternatively or in addition, the selection of one or more points may also be done in playback mode after the sequence is recorded (i.e., selecting a point on previously recorded images). Additionally, the frames shown during a playback mode can be sped-up or slowed-down as needed. The points may be selected using one of various input devices such as a keyboard, light pen, mouse, scroll bar or any other input device. To calculate a parameter, the system determines the number of frames that elapse between the selected points (step 56). Using the number of frames and the known frame speed, one or more parameters may be calculated (step 50). Optionally, the image may be enhanced based on the calculated parameter (step 60).

For example, referring to FIG. 1, the selected starting point may be in the frame at which the pitcher releases the ball 10. The selected ending point may be in the second frame that depicts when the ball crosses home plate 20. Optionally, one or more intermediate points or frames 30 may be selected along the trajectory of the ball. Based on the number of video frames that elapse between the starting point's frame and the ending point's frame, or based on a difference in time codes between the frames, one or more parameters may be calculated. For example, if forty-five frames elapse in the image sequence, and it is known that the image sequence has a frame speed of thirty frames per second, the system will calculate that the ball took 1.5 seconds to travel from the starting point in the first frame to the ending point in the second frame.

When other variables are known, other parameters may be calculated. For example, if the distance from the pitcher's mound to the home plate is known, the known distance and the calculated elapsed time may be used to determine the pitch speed in miles per hour, feet per second or another unit of measure. The distance may be predetermined, or it may be calculated "on the fly" as an operator points to relevant positions within the image sequence, such as a ball release location in a first frame and a ball catch location in a second frame. The distance may also be determined using one or more image reference techniques, such as the techniques described in co-pending U.S. patent application Ser. No. 10/613,273, filed Jul. 3, 2003, published Jan. 6, 2005 as Publication No. 2005-0001852, titled "System and Method for Inserting Content into an Image Sequence," which is incorporated herein by reference in its entirety. The distance may be determined using the points on the frames and include the location of the point inside the frame. Of course, any technique known to those skilled in the art may be used to calculate the distance between points in an event captured on video.

One skilled in the art will recognize that the event and parameters illustrated in FIG. 1 are merely intended to be illustrative. Although FIG. 1 illustrates certain parameters associated with a pitch in a baseball game, those skilled in the art will recognize that the system and method described herein may be used to determine parameters for many actions in many events. For example, the system may calculate the hang time of a kick in a football game; the speed, distance or elapsed time of a pass in a football game; the speed of a hockey puck in a hockey game; statistics associated with a drive or a putt in a golf tournament; calculations of speed of car chases in news or reality programs; and/or measurements in running races, horse races, and auto races. Parameters such as speed and elapsed time may be calculated between the first frame and the second frame, the first frame and one or more intermediate frames, between intermediate frames and a second frame, or even between intermediate frames. Multiple parameters may be calculated from a single frame sequence in some embodiments Referring again to FIG. 2, once one or more parameters are calculated, the image may be enhanced when it is presented to a viewer (step 60). For example, speed and/or elapsed time may be presented to the viewer in a pop-up box, in an on-field graphic, in an onscreen ticker or in another format. The enhancement may be calculated and shown to the viewer as the event is occurring. For example, the viewer may see the calculation of the number of yards that a running back is running on the screen during the play. In particular, the parameter can be calculated in real time, as the event is occurring, so show the parameter as the real world event unfolds. For example, in the case of a football pass, the approximate or actual yardage covered by the pass may be calculated, inserted into a video image sequence, and displayed to a viewer in real time as the pass occurs.

In addition, the enhancement may be shown in the form of a graphic, such as a bar graph, virtual meter, chart, or other graphic that corresponds to the parameter. The enhancement may be presented to all viewers, or it may be presented only to selected viewers, such as to announcers in an announcement booth, or to viewers who subscribe to a premium programming level on a subscription television network, or to viewers who meet predetermined criteria (such as residence ZIP code).

The image enhancement may also include a virtual line or other representation that tracks the trajectory of the event. For example, when the first frame, second frame, and one or more intermediate frames are selected, upon replay an image may be inserted, using an image insertion technique such as that described in the previously-mentioned, co-pending U.S. patent application Ser. No. 10/613,273, to draw a line or other image between the starting point, ending point and one or more intermediate points to illustrate the trajectory of the ball, puck, human or other moving object. When combined with the knowledge of frame speed and the fact that the points are selected not only based on screen location but also based on the frame in which they appear in the frame sequence, the virtual insert may follow the target in real time.

A user may view a replay of an event captured in an image sequence, and select specific start and end points in the image sequence, such as by a "point and click" input. A "point and click" input occurs when a user clicks on, taps or otherwise activates a mouse, light pen, trackball or other input device to select on a point in a frame. The system may then use the start and end points, along with the knowledge of the frame speed, to calculate a parameter such as elapsed time. With additional knowledge, such as distance between the two points, a graphic insert may be inserted into the image sequence, or even into a different image sequence such as an image sequence of the event captured from a different camera angle. For example, the insert may draw a line, using interpolation, to represent the trajectory of a ball from the start point to the end point. The line may be inserted very precisely in both time and location, when it is based on the start point, end point and image sequence.

In one embodiment, in the image enhancement step (step 60) an image sequence may be enhanced through the application of a transform function to visual content to be inserted into an image sequence, and blending the transformed visual content with the image sequence. The transforming step and the blending step together may result in insertion of the content into the image sequence such that the content appears at a target location as if it had been part of the original scene displayed by the image sequence. Exemplary techniques for performing such insertion are described in the previously-mentioned, co-pending U.S. patent application Ser. No. 10/613,273. The transforming step may include all applied geometric transformations of the visual content. Although not required, in some embodiments the enhancement location may be determined without reference to any content of the image sequence, and it may be performed without reference to any three dimensional real world space locations or dimensions such as the location of the camera that produced the image sequence. Optionally, the content may be placed on a moving object in the image sequence and displayed on the moving object as the object moves in the scene. The content may also include dynamically changing content.

Figure 3A:
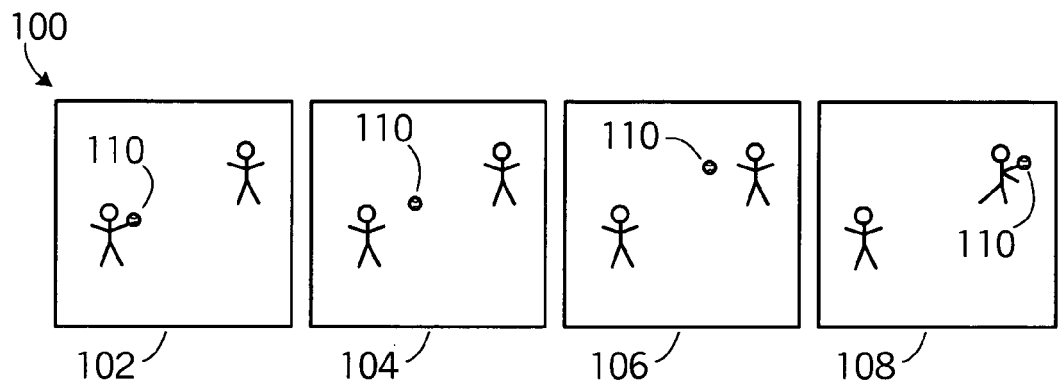
FIGS. 3A-3C illustrate exemplary image sequences, including an enhanced image sequence (FIG. 3B) and an alternate view enhanced image sequence (FIG. 3C)

An example of an image sequence with a real world event may be viewed by referring to FIG. 3A, which shows a first image sequence 100 illustrating the real world event of one player throwing a ball 110 to another player. In the first frame 102, the ball is held by a first player. In the second frame 104 the ball is thrown, and it approaches the second player in third frame 106. In the fourth frame 108 the second player catches the ball and optionally begins to run. The first image sequence 100 may be occurring in real time, as the event is captured by a camera, or it may be a playback of the event after the event occurs.

Figure 3B:
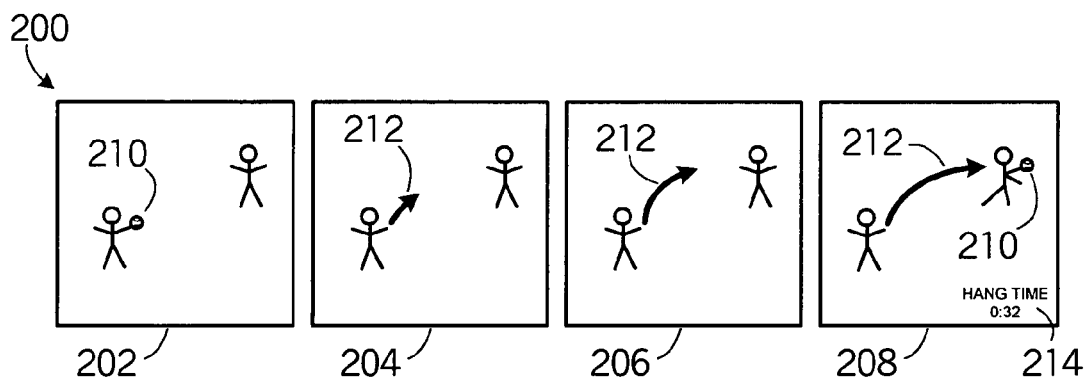

By selecting a first frame such as 102 and a second frame such as 108 in the first image sequence 100, referring to FIG. 3B an enhanced image sequence 200 may be presented for display, broadcast or recording. The second sequence may include an enhancement such as a trajectory line 212 and/or a parameter box 214 showing a parameter such as hang time of the ball. The parameter in the parameter box 214 may be calculated using the known number of frames between the frame wherein the ball is released (102 in FIG. 3A) and the frame wherein the ball is caught. Similarly, the trajectory line 212 location in each frame may be done by, depending on the frame, either (i) knowing the two positions where a user selected the target ball in the corresponding frame in the first image sequence, or (ii) by interpolation based on the positions where the user selected the ball locations in previous and later corresponding frames in the first image sequence.

Figure 3C:
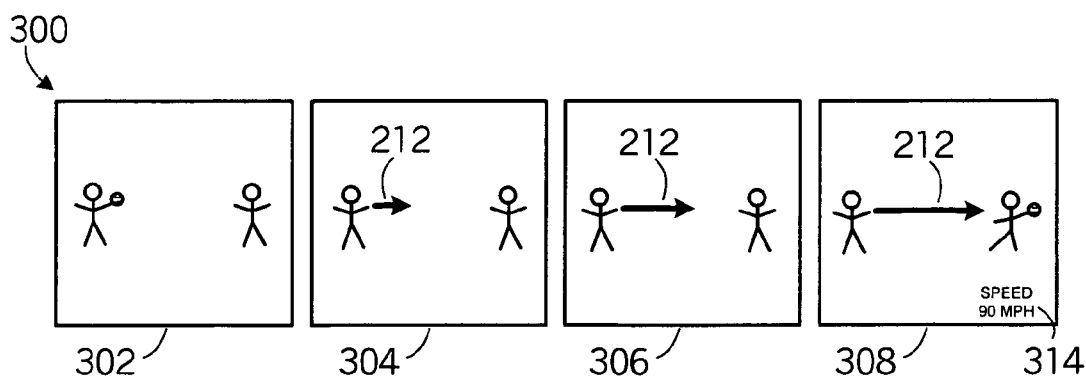

Referring to FIG. 3C, in an alternate embodiment the enhanced image sequence 300 may include an image sequence that was gathered from different camera, thus providing a different perspective on the real worked event. Optionally, using modeling techniques such as those described in the previously-mentioned, co-pending U.S. patent application Ser. No. 10/613,273, the insertion locations can be determined in each frame 302-308 in the alternate view image sequence 300, and optionally the image sequence 300 may be enhanced without pattern recognition or reference to actual content in the image sequence.

It is to be understood that the invention is not limited in its application to the details of construction and to the arrangements of the components set forth in this description or illustrated in the drawings. The invention is capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

What is claimed is:

1. A method of calculating a parameter from a frame sequence, the method comprising:
   selecting a first frame in a frame sequence, wherein the frame sequence has a frame rate, wherein the frame sequence comprises a plurality of frames, wherein selecting the first frame includes selecting a first location of a first real world event in the first frame;
   selecting a second frame in the frame sequence, wherein selecting the second frame includes selecting a second location of a second real world event in the second frame;
   selecting an intermediate frame in the frame sequence;
   calculating, via a computing device, a first parameter utilizing the frame rate;
   calculating a second parameter utilizing the frame rate, wherein the second parameter comprises a third location in a fourth frame, wherein the fourth frame is positioned either between the first frame and the intermediate frame or between the second frame and the intermediate frame in the frame sequence; and
   inserting, via the computing device, an image corresponding to the first parameter into a third frame of the frame sequence.

2. The method of claim 1 wherein the first parameter corresponds to the first real world event in the first frame and the second real world event in the second frame.

3. The method of claim 1 wherein selecting the first frame and selecting the second frame are performed while the frame sequence is occurring in real time.

4. The method of claim 1 wherein selecting the first frame and selecting the second frame are performed during a playback mode after the frame sequence has been recorded.

5. The method of claim 1 wherein
   calculating a first parameter comprises calculating a first parameter utilizing the frame rate and data corresponding to the first and second locations.

6. The method of claim 1 wherein calculating a first parameter comprises calculating a first parameter utilizing the frame rate and a factor corresponding to a real world event.

7. The method of claim 6 wherein the factor comprises at least one of distance, length, space, height, altitude, and elevation.

8. The method of claim 1 wherein the first parameter comprises at least one of distance, speed, and elapsed time.

9. The method of claim 1, wherein inserting an image comprises inserting an image in real time as the real world events occur.

10. A system for calculating a parameter from a frame sequence comprising:
    an image viewing device configured to enable an operator to select a first frame, a second frame, an intermediate frame, and a fourth frame in a frame sequence with a frame rate, a first location of a first real world event in the first frame, a second location of a second real world event in the second frame, and a third location in a fourth frame, wherein the fourth frame is positioned between the first frame and the intermediate frame or between the second frame and the intermediate frame;
    a parameter calculation device configured to calculate a first parameter using the frame rate and a unit of measure corresponding to the first frame and the second frame and to calculate a second parameter utilizing the frame rate and corresponding to the third location; and
    an image displaying device configured to display the information from the first parameter in the form of a graphic that is inserted into a fifth frame of a second frame sequence.

11. The system of claim 10 wherein the unit of measure comprises one or more of the following: a number of elapsed frames, a difference in time codes, and a distance between selected points.

12. The system of claim 10 wherein the displaying device is further configured to insert the information into an image sequence in correspondence to a time of occurrence of one or more of the first and second real world events.

* * * * *